Aug. 6, 1946.  J. H. VICTOR  2,405,279
OIL SEAL CONSTRUCTION
Filed Nov. 8, 1943
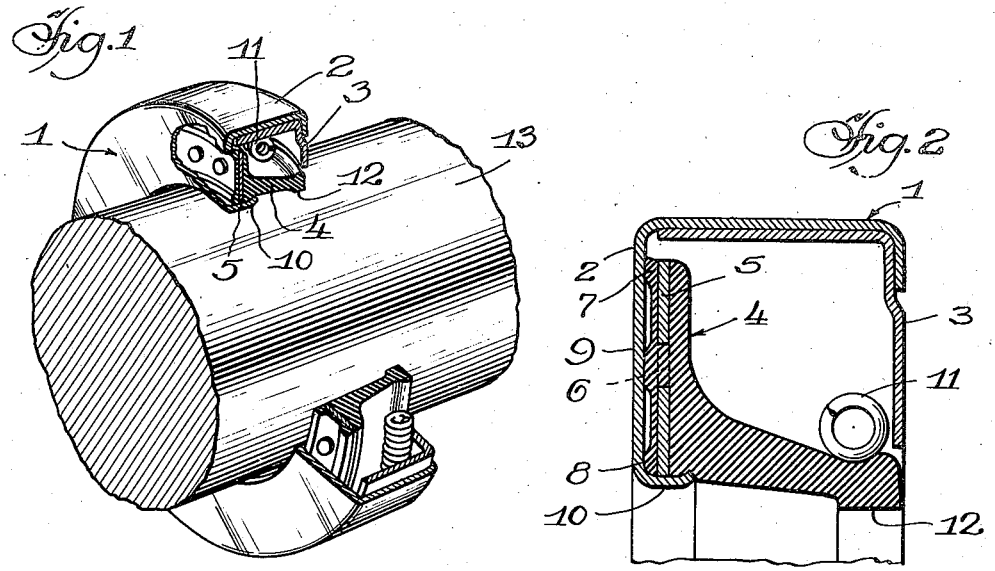
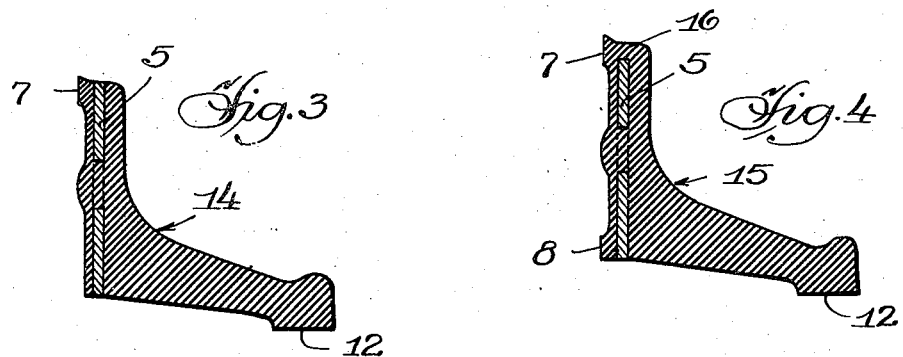
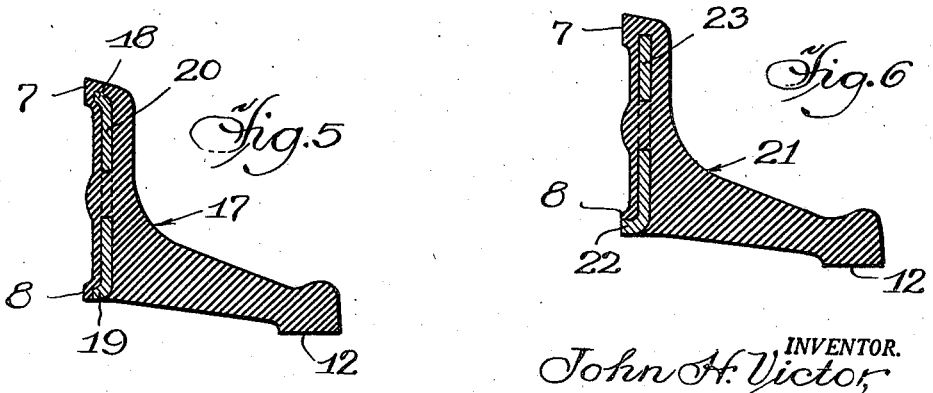
INVENTOR.
John H. Victor
BY
Parkinson & Lane
Attys
Witness:
Chas. J. Koursh.

Patented Aug. 6, 1946

2,405,279

UNITED STATES PATENT OFFICE 2,405,279

OIL SEAL CONSTRUCTION

John H. Victor, Wilmette, Ill., assignor to Victor Manufacturing & Gasket Company, Chicago, Ill., a corporation of Illinois Application November 8, 1943, Serial No. 509,363

1 Claim. (Cl. 288—3)

The present invention relates to an oil or fluid seal and especially to a novel sealing diaphragm and manner of anchoring this diaphragm in a retaining shell whereby to most effectively seal against leakage therebetween.

Among the objects of the present invention is to provide a novel reinforced sealing member or diaphragm adapted to be clamped in a retaining shell or housing, the diaphragm being provided with one or more annular compression ridges so disposed as to seal against the interior of the shell and thereby eliminate any possibility of leakage between the contacting or abutting surfaces of the shell and sealing diaphragm.

A further object of the invention is the provision of a novel sealing diaphragm formed of resilient material such as compounded synthetic rubber molded or bonded to a reinforcing washer, the reinforced sealing diaphragm being so constructed and mounted or clamped within a retaining shell in such manner as to prevent disengagement of the diaphragm from its clamped position within the shell.

The present invention further comprehends forming a novel construction of a resilient sealing diaphragm with one or more continuous sealing ridges or embossments so disposed that as the diaphragm is clamped in its operative position within a retaining shell, these ridges are compressed and yieldingly grip the adjacent surface of the shell or housing in such manner as to continuously seal thereagainst.

Another important advantage of the present invention is that the novel embodiment of reinforced sealing diaphragm eliminates bonding to the retaining shell or housing, permits the manufacture of these diaphragms in large quantities for future use, and provides a diaphragm that may be quickly assembled in retaining shells or housings of varying diameters.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel oil seal with the retaining shell or housing and the novel reinforced sealing diaphragm being broken away for a clearer understanding of the invention.

Figure 2 is a fragmentary view in vertical cross section showing the manner of mounting the reinforced sealing diaphragm within the shell or housing.

Figures 3, 4, 5 and 6 are views in vertical cross section through alternate constructions of sealing diaphragms.

Referring in detail to the disclosure in the drawing, the present oil seal comprises a retaining shell or housing 1 composed of outer and inner telescoping channel sections 2 and 3 for enclosing or housing a sealing diaphragm or element 4. This diaphragm is preferably constructed of an oil and fluid resistant resilient material such as compounded synthetic rubber molded to the desired shape and reinforced in its radially extending portion by a metal ring or washer 5 provided with spaced openings 6 into and through which the plastic sealing material flows in the molding opertion and becomes anchored therein. This results in the sealing material and the reinforcing washer being bonded together as a unit.

In the molding operation spaced, concentric compression ridges or outwardly projecting ribs 7 and 8 are formed at the back side of the washer or metal ring in such manner that they yieldingly grip the interior of the side wall 9 of the channel section 2 when the sealing diaphragm is positioned as shown in Figure 2 and subjected to radial pressure. This sealing element or diaphragm is anchored in position by spinning or curling over the edge 10 of the side wall 9 to form an inturned lip or flange that is anchored or imbedded into the resilient material of the sealing element 4 and applies a radial pressure thereagainst. A coil or contractile spring 11 maintains the sealing lip 12 in contact with a rotatable shaft or the like 13.

In Figure 3 there is disclosed a sealing element or diaphragm 14, the rear face of which is provided with but a single continuous compression rib or ridge 7.

Figure 4 shows a sealing element or diaphragm 15 in which the resilient sealing material at 16 is shown as extending beyond the outer edge or diameter of the washer or metal ring 5, and provided with spaced annular or circular compression ribs or ridges 7 and 8. In this form of the invention greater resiliency and gripping action is accorded the rib 7.

Figure 5 discloses a sealing member 17 similar to that shown in Figure 4 except that the opposite edges 18 and 19 of the washer or metal ring 20 are bent or flanged rearwardly.

Figure 6 shows a sealing member or diaphragm 21 similar to that disclosed in Figure 5 except that only one edge 22 of the metal ring or washer 23 is bent or flanged rearwardly and this edge preferably extends to the surface of the concentric or circular rib or ridge 8.

In each of the various forms of reinforced sealing members or diaphragms shown in the drawing, the edge 10 of the side wall 9 of the retaining shell or housing is bent over the inner edge of the reinforcing washer or metal ring and embedded or clinched into the resilient or rubber-like material of the sealing diaphragm. The concentric gripping ribs or ridges on the rear face of the diaphragms being of the resilient material of the diaphragm, provide what might be termed an annular suction cup which tightly grips or grasps the inner surface of the wall 9 and provides a continuous anchoring and sealing contact with this wall.

Having thus disclosed my invention, I claim:

In an oil seal comprising in combination an annular channel-shaped retaining shell, a sealing element of rubber-like material of annular formation having an axially extending sealing section and a radially extending section, a metallic reinforcing ring having its outer section initially wholly encased within said radially extending section, and means providing a vacuum cup effect comprising spaced annular concentric flat face rubber flanges integrally formed on the face of said last-mentioned section.

JOHN H. VICTOR.